United States Patent [19]

Kaneko et al.

[11] Patent Number: 5,446,570
[45] Date of Patent: Aug. 29, 1995

[54] LIQUID CRYSTAL DISPLAY WITH PROJECTING PORTIONS ON THE ELECTRODES

[75] Inventors: Shuzo Kaneko, Yokohama; Shinjiro Okada, Isehara; Satoshi Yuasa, Yokohama; Katsuhiko Shinjo, Isehara; Hirokatsu Miyata, Yokohama; Masaaki Shibata, Kanagawa, all of Japan

[73] Assignee: Canon Kabushiki Kaisha, Tokyo, Japan

[21] Appl. No.: 230,775

[22] Filed: Apr. 21, 1994

[30] Foreign Application Priority Data

Apr. 27, 1993 [JP] Japan .................................. 5-101040
Apr. 28, 1993 [JP] Japan .................................. 5-102753

[51] Int. Cl.⁶ .......................................... G02F 1/1343
[52] U.S. Cl. .......................................... 359/87; 359/56
[58] Field of Search ........................ 359/87, 56, 54, 100

[56] References Cited

U.S. PATENT DOCUMENTS

| | | | |
|---|---|---|---|
| 4,542,960 | 9/1985 | Yang | 359/87 |
| 4,712,877 | 12/1987 | Okada et al. | 350/350 S |
| 4,738,515 | 4/1988 | Okada et al. | 350/350 S |
| 4,747,671 | 5/1988 | Takahashi et al. | 350/336 |
| 4,763,994 | 8/1988 | Kaneko et al. | 350/336 |
| 4,796,980 | 1/1989 | Kaneko et al. | 350/350 S |
| 4,815,823 | 3/1989 | Kaneko | 350/336 |
| 4,818,078 | 4/1989 | Mouri et al. | 350/350 S |
| 4,824,218 | 4/1989 | Kuno et al. | 350/350 S |
| 4,902,107 | 2/1990 | Tsuboyama et al. | 350/350 S |
| 4,906,072 | 3/1990 | Kaneko et al. | 350/333 |
| 4,973,135 | 11/1990 | Okada et al. | 350/334 |
| 5,026,144 | 6/1991 | Taniguchi et al. | 350/350 S |
| 5,119,219 | 6/1992 | Terada et al. | 359/56 |
| 5,251,050 | 10/1993 | Kurematsu et al. | 359/57 |
| 5,270,844 | 12/1993 | Maruyama et al. | 359/87 |

FOREIGN PATENT DOCUMENTS

| | | |
|---|---|---|
| 59-193427 | 11/1984 | Japan . |
| 61-166590 | 7/1986 | Japan . |
| 62-119521 | 5/1987 | Japan . |
| 62-125330 | 6/1987 | Japan . |
| 62-145216 | 6/1987 | Japan . |
| 64-77023 | 3/1989 | Japan . |

Primary Examiner—Anita Pellman Gross
Assistant Examiner—Charles Miller
Attorney, Agent, or Firm—Fitzpatrick, Cella, Harper & Scinto

[57] ABSTRACT

The present invention provides a liquid crystal device having excellent gradation characteristics. A liquid crystal device of the invention has a liquid crystal held between a pair of electrodes. At least one of the electrodes is provided with a plurality of stripe electrodes with different spaces therebetween, and films provided between the respective stripe electrodes and having a sheet resistance of $10^4 \, \Omega/\square$ to $10^8 \, \Omega/\square$. Alternatively, at least one of the electrodes has a plurality of projecting stripe portions formed thereon with different spaces within each of the pixels formed by intersections of both electrodes, the spaces between the projecting portions changes with a gradient within a pixel, and means for forming a distribution gradient of the strength of the electric field applied to the liquid crystal along the gradient of the space change. Thus, the controllability of the occurrence position of a reverse region and extension thereof is improved, and the applied voltage-transmittance characteristic with good linearity are obtained.

9 Claims, 10 Drawing Sheets

16V

18V

20V

22V

13V 14.5V

16V 17.5V

LIQUID CRYSTAL DISPLAY WITH PROJECTING PORTIONS ON THE ELECTRODES

BACKGROUND OF THE INVENTION

1. Field of the Invention

The present invention relates to an optical modulation device comprising a liquid crystal for a display apparatus, a liquid crystal printer or the like, and particularly to an optical modulation device comprising a liquid crystal having memory properties for imparting good display characteristics to the device.

2. Related Background Art

Ferroelectric liquid crystals (FLC) are positively used for display devices, light valves, etc. from the view point of the advantages thereof with respect to a high speed and good memory properties.

Examples of targets for making use of the above advantages include an optical shutter (valve) array, a high definition display apparatus driven by a simple matrix, a high-density recording light valve combined with a photoconductor and so on. An image display driven by an active matrix comprising thin film transistors (TFT) is also expected.

Further, much effort is put into obtaining a good half tone (gray-scale) which is an indispensable problem in improvement of the display performance of the FLC.

A method of naturally producing irregularities on an electrode substrate or intentionally imparting a micro mosaic pattern, as disclosed in the specification of Japanese Patent Laid-Open No. 59-193427, and a method of obtaining gradation by providing the thickness of an insulating layer with a step-formed distribution, as disclosed in Japanese Patent Laid-Open No. 61-166590, are exemplified as a method of creating a mixed state of white and black (bright and dark) domains in a single pixel. Japanese Patent Laid-Open No. 64-77023 discloses a method of obtaining an alignment having many defects. Many other methods such as a method of providing a pattern of irregularities with a periodic structure have also been proposed.

However, although it was confirmed that the above methods produce a half tone state, there have been demands for a half tone which is further uniformed in pixel or gradation characteristics which can easily be controlled.

Furthermore, it is necessary for maintaining a good contrast to form a liquid crystal alignment in which defects are less observed.

On the other hand, the inventors of the present invention proposed a method of providing gradation by producing a delay of potential transmission in a pixel in Japanese Patent Laid-Open No. 62-119521, a method of providing gradation by forcing a potential gradient to form in a pixel in Japanese Patent Laid-Open No. 62-125330 and others, and a method of providing gradation by forming a gradient in the electrode distance (cell thickness) in Japanese Patent Laid-Open No. 62-145216. All these methods employ a gradient of the field strength applied to a liquid crystal in a pixel for controlling a reverse area of the liquid crystal.

A typical method of the methods disclosed in Japanese Patent Laid-Open Nos. 62-119521 and 62-125330 is a method of forming a basic structure comprising low-resistance electrode lines and a relatively high-resistance film bonded thereto so that a potential gradient is formed in the high-resistance film by delaying transmission of the potential supplied to the electrode lines in the high-resistance film and by supplying different potentials to at least two of the low-resistance electrodes which hold the high-resistance film therebetween in a plane.

The method of providing a potential gradient has the following technical problems to be solved: Since the low-resistance electrode lines generally have considerable resistances, when a potential is applied to the electrode lines from an external power supply, nonuniformity occurs in the voltage applied to the liquid crystal due to a delay of a drop of the potential in the electrode lines between a feed portion and a portion apart from the feed portion. For example, when a matrix panel having about 1000×1000 pixels is formed, there is the possibility that local nonuniformity considerably occurs in gradient display.

The method of forming a gradient in the electrode distance which is represented by the method disclosed in Japanese Patent Laid-Open No. 62-145216 sometimes requires a significant difference in the cell thickness for obtaining a large gamma characteristic (typically, saturation voltage ÷ threshold voltage) as a gradation characteristic. In this case, the difference in the cell thickness causes a large difference in retardation and thus causes optical coloring, thereby causing difficulties in color display.

SUMMARY OF THE INVENTION

An object of the present invention is to solve the above technical problems and provide a liquid crystal device having excellent gradation characteristics.

Another object of the present invention is to provide a liquid crystal device which can attain good alignment and a uniform stable half tone and which can realize gradation driving easy to control.

In order to achieve the objects, in accordance with an embodiment of the present invention, there is provided a liquid crystal device comprising a liquid crystal disposed between a pair of electrodes, wherein at least one of the electrodes has a plurality of stripe electrodes which are formed with continuity and different distances therebetween within each of the pixels formed by intersections of the both electrodes, and films provided at least between the stripe electrodes and having a sheet resistance of $10^4$ ohms per square ($\Omega/\square$) to $10^8$ ohms per square ($\Omega/\square$).

The differences in the distance are provided so as to form a gradient in each pixel. Each of the stripe electrodes comprises a projecting portion at a height of 5% to 15% of the cell thickness used so that an excellent display device can be obtained.

In accordance with the present invention, the occurrence position of the reverse region is controlled by forming stripe irregularities, the extension of the reverse region in a direction is controlled by changing the distance between the stripe portions, and the extension of the reverse region in the other direction is controlled by delaying the potential transmission between the projecting stripe portions so that the controllability of the area of a reverse region can be improved. The present invention can thus provide a liquid crystal device having linearity ($\gamma$) between the stable applied voltage and the transmission characteristic and excellent gradation characteristics In accordance with another embodiment of the present invention, there is provided a liquid crystal device comprising a liquid crystal held between a pair of electrodes, wherein at least one of the electrodes has a plurality of projecting stripe portions which formed with different spaces therebetween in each of the pixels formed by intersections of both electrodes. The changes in the spaces form a gradient, and the liquid crystal device further comprises a means for forming a distribution gradient of the electric field strength acting on the liquid crystal along the gradient of the space changes. The space changes form a gradient over a single pixel.

In accordance with a further embodiment of the present invention, there is provided a liquid crystal device comprising a liquid crystal held between a pair of electrodes, wherein at least one of the electrodes has first low-resistance stripe electrodes to which electricity is supplied, and a plurality of second stripe electrodes separately formed with different distances therebetween within each of the pixels formed by intersections of both electrodes. A film having a sheet resistance of $10^4 \Omega/\square$ to $10^8 \Omega/\square$ is provided in each of the distances between the first and second stripe electrodes.

In accordance with a still further embodiment of the present invention, there is provided a liquid crystal device comprising a liquid crystal held between a pair of electrodes, wherein at least one of the electrodes has a plurality of projecting stripe portions formed thereon with different spaces therebetween in each of the pixels formed by intersections of both electrodes. The changes in the spaces between the respective projecting portions form a gradient, and the electrode distance between a pair of electrode substrates has a gradient.

DETAILED DESCRIPTION OF THE PREFERRED EMBODIMENTS

Figure 1A:
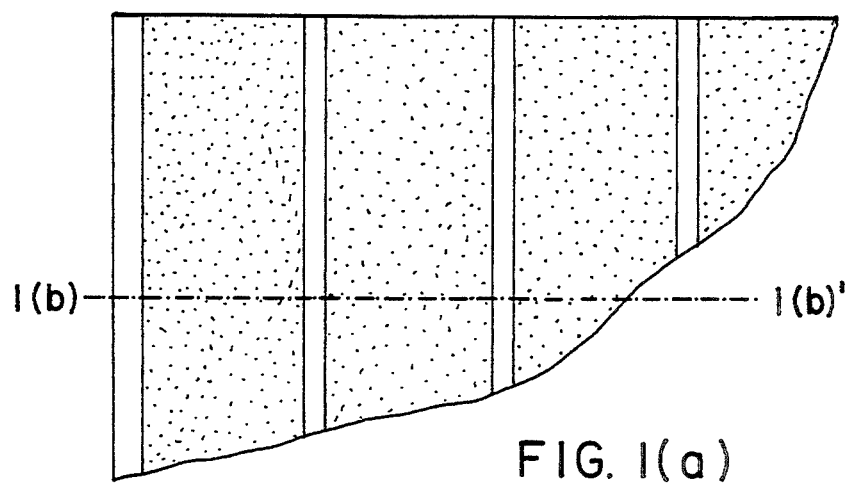
FIGS. 1(a)–1(d) are schematic drawings illustrating the configuration of a liquid crystal device in accordance with an embodiment of the present invention.
Figure 1B:
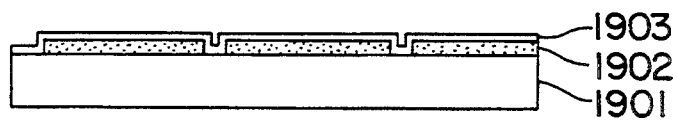
Figure 1C:
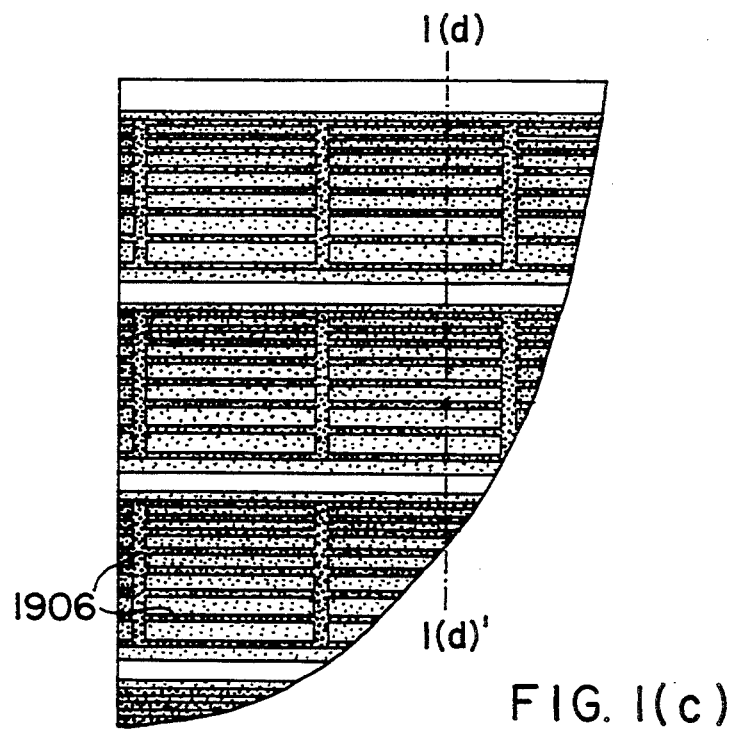
Figure 1D:
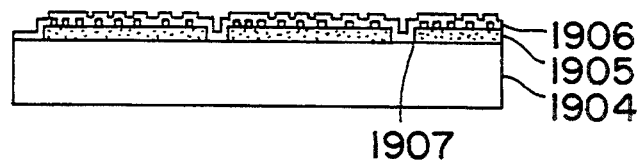

FIGS. 1(a)–1(d) are schematic drawings illustrating the configuration of a liquid crystal device in accordance with an embodiment of the present invention. In the drawings, FIGS. 1(a) and 1(b) illustrate an upper substrate (SUBU), and FIGS. 1(c) and 1(d) illustrate a lower substrate (SUBL). FIGS. 1(a)–1(d) show a plane structure and a sectional structure of each of the substrates.

The lower substrate SUBL as one of the electrodes or substrates used in the present invention has stripe-formed irregularities formed by film formation and etching or mask deposition for forming a pattern.

The differences in the height of the irregularities are substantially uniform in a single pixel, all projecting stripe portions have a width of about 4 μm, and the width of the recessed portions, i.e., the spaces between the stripes, gradually Changes in a predetermined direction.

In the embodiment shown in FIGS. 1(a)–1(d), the stripes can be formed so that the spaces are changed from 1 μm to 6 μm by about 0.5 μm every 2 space. For example, when the first stripe space is $LS_1$, the second stripe space is $LS_2$, and the ith stripe space is $LS_i$, $LS_1 = LS_2 = 1$ μm, $LS_3 = LS_4 = 1.5$ μm, $LS_5 = LS_6 = 2$ μm, ... and $LS_{21} = LS_{22} = 6$ μm.

In the upper substrate SUBU shown in FIG. 1(b), reference numeral 1901 denotes a transparent substrate of glass, quartz or plastic; reference numeral 1902, a transparent electrode comprising ITO, $SnO_2$ or $In_2O_3$; reference numeral 1903, an orientation film (alignment film) obtained by rubbing a film of polyimide, nylon or another resin, or a generally known conductive polymer material such as polyaniline, polypyrrole or the like, or by obliquely depositing SiO, $SiO_2$ or the like.

On the other hand, in the lower substrate SUBL as shown in FIG. 1(d), reference numeral 1904 denotes the same transparent substrate as the substrate 1901. Reference numeral 1905 denotes a film used in the present invention and referred to as a "high-resistance film" for convenience' sake because the resistance thereof is higher than that of stripe electrodes 1906. However, it should be noted that the resistance of the high-resistance film is lower than that of a conventional film. In the present invention, in the arrangement of the high-resistance film and the stripe electrodes (projecting stripe portions) on the substrate 1904,i the high-resistance film 1905 may be formed after the stripe electrodes are formed. Pixels are formed by intersections of the transparent electrodes of the upper substrate and the high-resistance film of the lower substrate.

An orientation film 1907 is then provided in accordance with demand. The orientation film 1907 may be the same as the orientation film 1903 comprising a rubbed film or an obliquely deposited film so as to provide an internal liquid crystal with monoaxial orientation, or a film which is not subjected to monoaxial orientation treatment, such as a film of a silane coupling agent or an inorganic simple deposited film.

Although good orientation is obtained when the direction of monoaxial orientation provided by orientation treatment of the upper and lower substrates is close to the lengthwise direction of the projecting stripe portions, another direction may be selected. Polarizing plates which are arranged in a cross nicol are provided on the outsides of the upper and lower substrates holding a liquid crystal therebetween so as to control light transmittance.

As the material for forming the projecting portions, a metal such as Al, Ti, Au, Pt, Cr or the like, a transparent conductive oxide such as $SnO_2$, $In_2O_3$, ITO or the like is more preferred, and a transparent material is most preferred. The projecting portions are formed by the known patterning or deposition process.

The line width of the projecting stripe portions is preferably greater than the thickness of the liquid crystal cell used, more preferably 2 μm to 10 μm. The length of the stripes is preferably greater than the maximum space, and more preferably substantially equal to the length of one pixel or greater than the length of one pixel and continued over the whole length of, for example, a scanning electrode.

The spaces between the projecting stripe portions are changed to an upper limit of about 10 μm, thereby causing good effects on gradation.

The projecting stripe portions are provided with continuity therebetween in each of the portions between the pixels so that a substantially uniform potential is applied to the projecting portions, as shown in FIGS. 1(a)–1(d).

A description will now be made of the gradation effect caused by imparting a gradient to the changes in the spaces between the stripe electrodes, and connecting the spaces by the high-resistance film, as described above.

The projecting portions control the occurrence point of a domain so as to uniform domains in each the pixels. The projecting portions apply a strong electric field directly to the liquid crystal and clearly preferentially respond during application of the electric field. The molecular arrangement in the vicinity of each of the projecting portions possibly finely changes. Particularly, the effect of facilitating receive of the electric field as a torque is recognized in the vicinity of each projecting portion.

Figure 2:
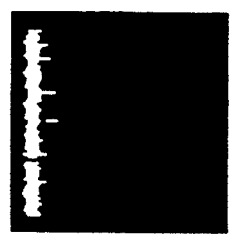
FIG. 2 is a schematic drawing illustrating the state where, a reverse region is formed in a liquid crystal device in accordance witch the present invention.
Figure 2:
Figure 2:
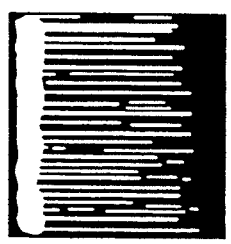
Figure 2:
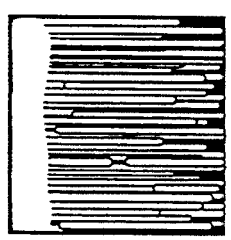

It is conceivable that the formation of gradation gamma by the changes in the spaces is mainly caused by overlapping of the effect of propagating the preferential reversal response of the projecting portions to the spaces, and the process of applying a delayed potential to the high-resistance films of the spaces. Namely, in the process of latching (fixing) as a domain the liquid crystal molecules swung by the application of the electric field are, the liquid crystal molecules are easily subjected to the reversal function in the small spaces between the projecting portions due to the effect of propagation from the projecting portions and the effect of delaying the transmission of the potential to the high-resistance film, and the reversal function is decreased due to decreases in the propagation effect and in the average electric field effect caused by the delay of transmission of the potential in the large spaces. As a result, the small spaces are fixed as a reverse domain as a whole at a low voltage, and the reverse region with gradation which is a really controlled in each of the pixels is formed under control of the occurrence position and extension thereof, as shown in FIG. 2.

Namely, the linear reverse domain is controlled in its linear extension and widthwise extension. Further, the gradient of the space changes imparts a smooth characteristic (linear gamma characteristic) to the gradation control by modulation of the peak value of the driving pulse applied, the pulse width and pulse waveform. This is possibly caused by the continuous gradation of the stepwise space changes which is due to the phenomenon that the extension of the reverse domain area is subsidiarily subjected to the effect of propagation from the smallest space.

Assuming that the typical pulse width for driving the display device at a high speed is about 20 μs, it is preferred for providing the delay effect and setting the necessary voltage applied within the pulse width to a not too high value that the high-resistance film has a sheet resistance of about $10^4$ Ω/□ to $10^8$ Ω/□. The above values are calculated from the resistance produced by the distance between the stripe electrodes and a position on the high-resistance film, the path extending over the distance and the approximately estimated capacity between the opposite electrodes holding the liquid crystal therebetween, or induced by simulation of an equivalent circuit. However, the sheet resistance is set to any desired value within the above range so that gradation can be designed with a degree of freedom and can be adjusted.

A film of an inorganic oxide such as $Sn_xO_y$, $Ta_xO_y$ or the like is most suitable for the above-described high-resistance film, and the resistance value of such a film can be adjusted by controlling the concentration of oxygen gas used in film formation.

A rubbed film made of a doped conductive polymer such as polyaniline, polypyrrole or polyacetylene, or a film formed by spray-coating ultrafine particles of $SnO_2$, ITO, another metal or metal oxide on a resin material of polyimide, polysiloxane or nylon may be used as an orientation film with orientation capability.

Since the excessively large difference in height causes orientation defects, the irregularities produced by forming the stripe electrodes have an upper limit of the height which is about 20% and preferably 15% or less, of the cell thickness so that good orientation can be maintained.

Further, although the difference in height may be basically zero when the electric field is exerted, the difference in height is preferably at least 5%, more preferably 5% to 15%, for effectively employing the above effect of delaying the application of the electric field and the dynamic effect produced by the projecting electrodes.

In a typical example, the Optimum difference in height of the projections is 1500 Å when the average thickness of the liquid crystal is about 1.5 μm.

Figure 3A:
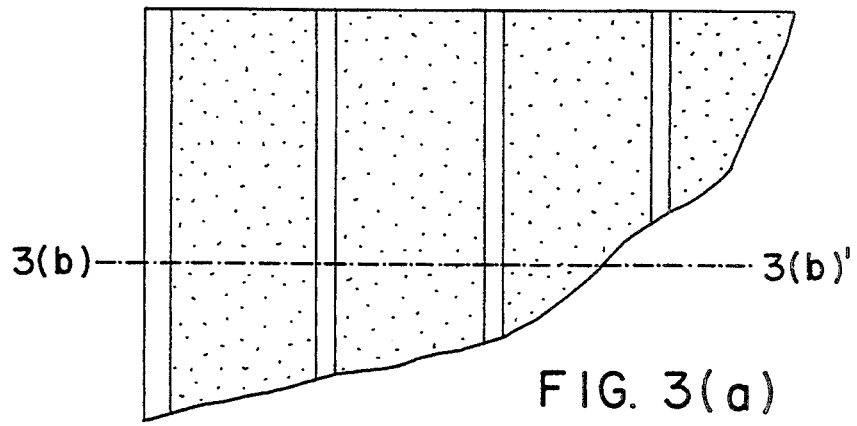
FIGS. 3(a)–3(c) are schematic drawings illustrating the configuration of a liquid crystal device in accordance with the present invention.
Figure 3B:
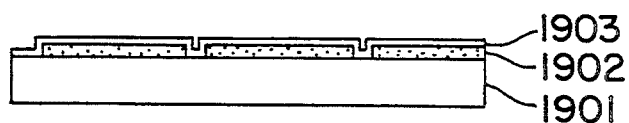
Figure 3C:
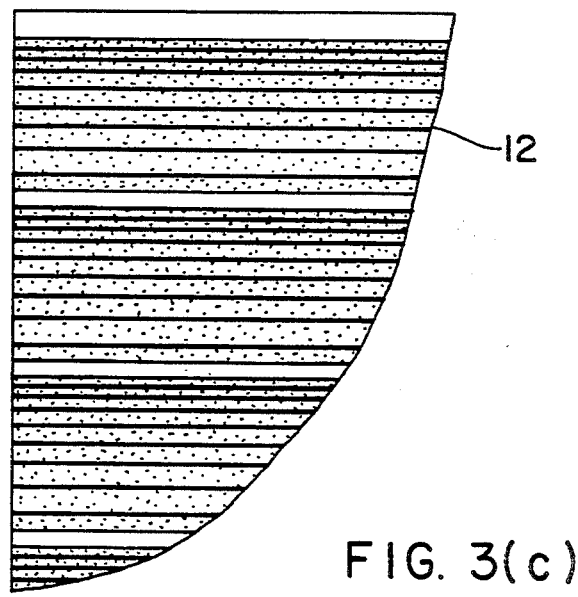

FIGS. 3(a)–3(c) are schematic drawings illustrating a matrix type liquid crystal device in accordance with another preferred embodiment of the present invention. FIGS. 3(a) and 3(b) show a plane and section of an upper substrate, respectively, and FIG. 3(c) illustrates a plane of a lower substrate.

In the upper substrates, as shown in FIG. 3(b), reference numeral 1901 denotes a transparent substrate made of glass, quarts or plastic; reference numeral 1902, a transparent electrode made of ITO, $SnO_2$ or $In_2O_3$; and reference numeral 1903, an orientation film obtained by rubbing a film of polyimide, nylon, another resin or a film generally known as a conductive polymer material such as polyaniline or polypyrrole, or by obliquely depositing SiO or $SiO_2$.

On the other hand, projecting stripe portions 12 are provided as a component on the lower substrate. For example, the projecting portions have a width of 4 μm and a height of about 1500 Å with spaces therebetween which are continuously changed in a step of 0.5 μm from 2 μm to about 10 μm within the pixel width. When a cell is formed by combining the upper and lower substrates in a cross matrix, pixels are formed by intersections of the transparent electrode of the upper substrate and the projecting portions of the lower substrate.

Materials most suitable as the material for forming the projecting portions include metals such as Al, Ti, Au, Pt, Cr and the like, transparent conductive oxides such as $SnO_2$, $In_2O_3$, ITO and the like. Other materials for forming the projecting portions include other inorganic substances such as $SiO_2$ and the like, resins such as polyimide, polyamide and the like. The projecting portions are formed by the known patterning or deposition process.

The orientation film provided on the projecting portions according to demand may be the same as the film 1903 comprising a rubbed film or obliquely deposited film so as to impart monoaxial orientation to the internal liquid crystal, or a film which is not subjected to monoaxial orientation treatment, such as a film of a silane coupling agent or an inorganic simple deposited film.

When the direction of the monoaxial orientation caused by orientation treatment of the upper and lower substrates is close to the lengthwise direction of the projecting stripe portions, good orientation is obtained. However, even if another direction is selected, the effects of the present invention are satisfactorily recognized. Polarizing plates which are arranged in a cross nicol are provided on the outsides of the upper and lower substrates.

The constructions of liquid crystal devices in accordance with other preferred embodiments of the present invention are described in detail below with reference to the sectional views of three cells shown in FIGS. 4(a), 4(b) and 4(c).

In the present invention, attention is given to the continuous gradation caused by the gradient change of the spaces between the projecting portions, and a gradient is added to the strength of the electric field applied to the liquid crystal along the gradient change of the spaces so as to give a batter control effect to gradation and to solve the problems of the conventional gradation method of applying a gradient to electric field strength.

Figure 4A:
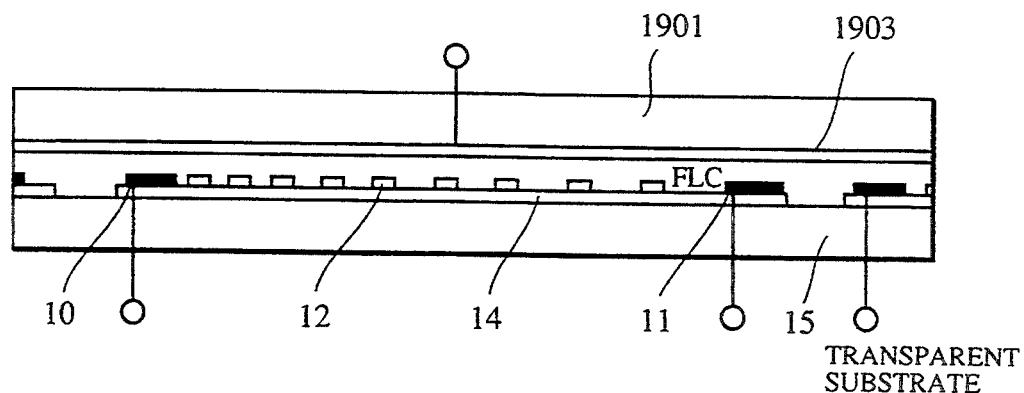
FIGS. 4(a) to 4(c) are schematic sectional views illustrating liquid crystal devices in accordance with three typical embodiments of the present invention.

FIG. 4(a) shows a cell in which a potential gradient is forced to form on the lower substrate along the gradient change of the spaces between the projecting portions so as to form, due to a difference from the potential of the opposite upper substrate, a distribution gradient of the electric field strength in the liquid crystal held between the opposite upper and lower substrates along the gradient change in the spaces between projecting portions.

In FIG. 4(a), reference numerals 10 and 11 each denote an electrode to which electricity is supplied from the outside, which are made of a low-resistance metal such as Al, Cr, Au or the like.

Reference numeral 14 denotes a transparent film made of a metal oxide such as $Sn_xO_y$, $Ta_xO_y$ or the like and having a sheet resistance which is adjusted to about $10^4$ Ω/□ to $10^8$ Ω/□. Such a transparent film can be formed by controlling the oxygen concentration in film formation. In this embodiment, the projecting stripe portions 12 are provided on the high-resistance film and preferably formed by using a low-resistance material such as a metal or ITO. The film 14 has a resistance higher than that of the metal or ITO of the projecting portions 12 and is thus referred to as "high-resistance film" for convenience' sake.

The orientation film is not shown in the drawings.

In the present invention, in the arrangement of the high-resistance film 14 and the stripe electrodes on the substrate 15, the film 14 may be formed after the stripe electrodes 12 or the low-resistance electrodes 10 and 11 are formed.

In this case, the high-resistance film 14 may comprise a film of a doped conductive polymer such as polyaniline, polypyrrole, polyacetylene or the like, or a film formed by dispersively coating ultrafine particles of a metal or metal oxide such as SnO2, ITO or the like on a parent material of a resin such as polyimide, polysiloxane, nylon or the like. The high-resistance film 14 may be rubbed so as to be also used as an orientation film according to circumstances.

Figure 5:
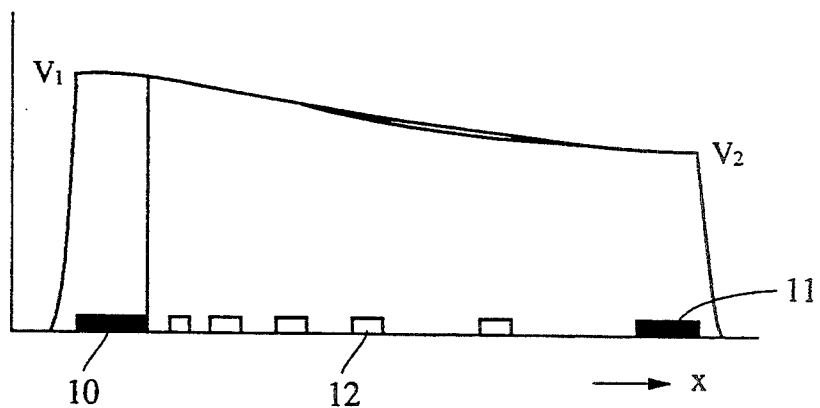
FIG. 5 is a graph illustrating a relation between a position on an electrode and a potential thereof.

If different potentials $V_1$ and $V_2$ are applied to the low-resistance electrodes 10 and 11, respectively, a potential gradient as shown in FIG. 5 is formed. As a result, a distribution gradient of the field strength is formed in the liquid crystal portion relative to the potential applied according to the gradation of the electrode 1902 of the upper substrate.

Description will now be made of the gradation effect which is caused by forming a potential gradient over the whole pixel and a gradient change in the spaces between the projecting stripe electrodes, as described above.

The projecting portions uniform the occurrence points of gradation domains in each of the pixels. The projecting electrode portions exert a strong electric field directly on the liquid crystal, and preferentially definitely respond in application of an electric field, as compared with the other portions. Further, the fine molecular arrangement in the vicinity of each of the projecting portions possibly change, and, particularly, the effect of facilitating receive of the electric field as a torque is observed in the vicinity of each projecting portion.

Figure 6:
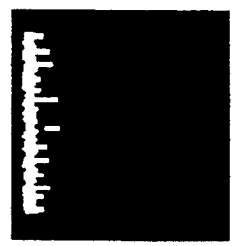
FIG. 6 is a schematic drawing illustrating the formed reverse domain for explaining the gradation display operation of a liquid crystal device in accordance with the present invention.
Figure 6:
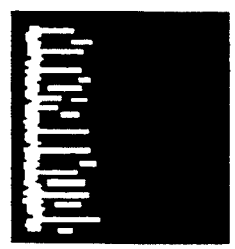
Figure 6:
Figure 6:
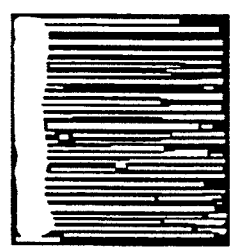

The effect of forming gradation gamma which is caused by the changes in the spaces is mainly caused by overlapping of the effect of propagating the reversal response preferred to the projections and the gradient of the strength of the electric field applied to the whole pixel under control. Namely, in the process of latching (fixing), as a domain, the liquid crystal molecules swung by the application of the electric field, the liquid crystal molecules in a small space between the projecting electrodes is easily subjected to the reversal effect due to the effect of propagation from the projecting portions, and the effect of the gradient electric field strength, and the reversal effect in a large space is decreased due to decreases in the propagation effect and in the average electric field strength. As a result, a portion with a small space is fixed as a reverse domain as a whole at a low voltage to form a gradient reverse portion which is a really controlled within a pixel, as shown in FIG. 6.

The space change and the gradient electric field strength cause the gradation to be controlled by modulating the peak value of the driving pulse applied, the pulse width and pulse waveform thereof to obtain the smooth gamma characteristic. This is possibly caused by the phenomenon that a continuous gradation is created for the stepwise changes in the spaces by the extension of the reverse domain area which is subordinately subjected to the effect of propagation from the portion with the smallest space.

On the other hand, the nonuniformity in the potential gradient caused by a potential drop in the above-described conventional example is removed by providing a plurality of low-resistance stripe projections on the high-resistance film.

Figure 7A:
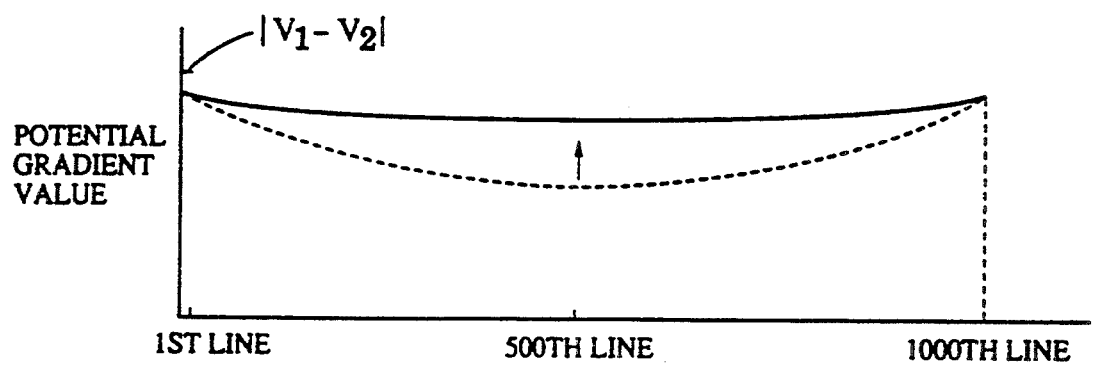
FIGS. 7(a) and 7(b) are schematic drawings illustrating the potential change produced by a Conventional potential gradient method.
Figure 7B:
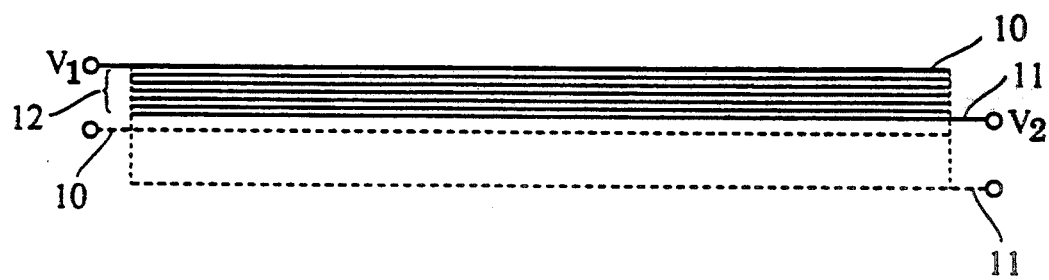
Figure 8:
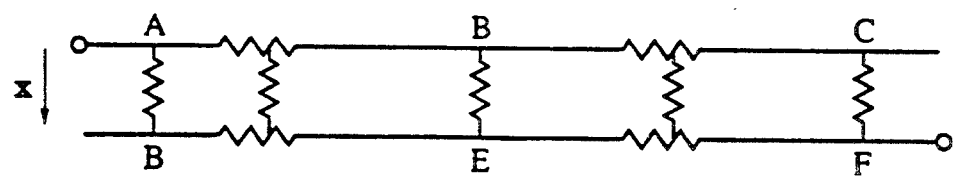
FIG. 8 is a drawing of an equivalent circuit of electrodes for illustrating the principle of potential changes.

In FIGS. 7(a) and 7(b), a dotted line represents the nonuniformity in the potential gradient value in a portion (at the end) near the feeding portion and a portion (central portion) far from the feeding portion in a line (for example, on the scanning side) for supplying a potential gradient in the conventional potential gradient configuration. This nonuniformity is caused by the phenomenon that the potential gradient values at the ends (in FIG. 8, between A and D and between C and F) are lower than that at the central portion (between B and E) due to the correlation between the resistance present in the low-resistance feeding line and the resistance in the high-resistance film, as schematically shown in FIG. 8. However, in the present invention, the formation of the low-resistance stripe projections 12 decreases the apparent wiring resistance at a distance x from the low-resistance feeding line and maintains an equipotential surface, thereby removing the nonuniformity in the potential gradient value, as shown by a solid line in FIG. 7.

If a typical pulse width for driving a display device at a high speed is, for example, about 20 μsec, the resistance of the high-resistance film is preferably $10^4$ Ω/□ or more for preventing a flow of an excessive current, and $10^8$ Ω/□ or less for attaining a desired potential gradient within the pulse width. On the other hand, the sheet resistance of the low-resistance feeding electrode is preferably 10 Ω/□ or less, and the sheet resistance of the projecting stripe portions is preferably $10^4$ Ω/□ or less. The height of the projecting stripe portions is preferably 3000 Å or less for preventing turbulence of orientation, and about 5% to 15% of the thickness of the cell used. As an example, a display device having an average cell thickness of about 1.5 μm and the projecting stripe portions at a height of about 1500 Å exhibits good characteristics.

The width of the projecting stripe portions is preferably within a range of values greater than the thickness of the liquid crystal cell used, more preferably 2 μm to 10 μm. The length of the projecting stripes is greater than the maximum space width, and more preferably substantially equal to the length of one pixel or more. For example, the projecting stripes may continue over the whole length of the scanning electrode.

It is preferred from the viewpoint of orientation that the space widths between the projecting portions are preferably substantially equal to the cell thickness or more. When the space widths are changed to about 20 μm as an upper limit, good effects on gradation are obtained.

Figure 9:
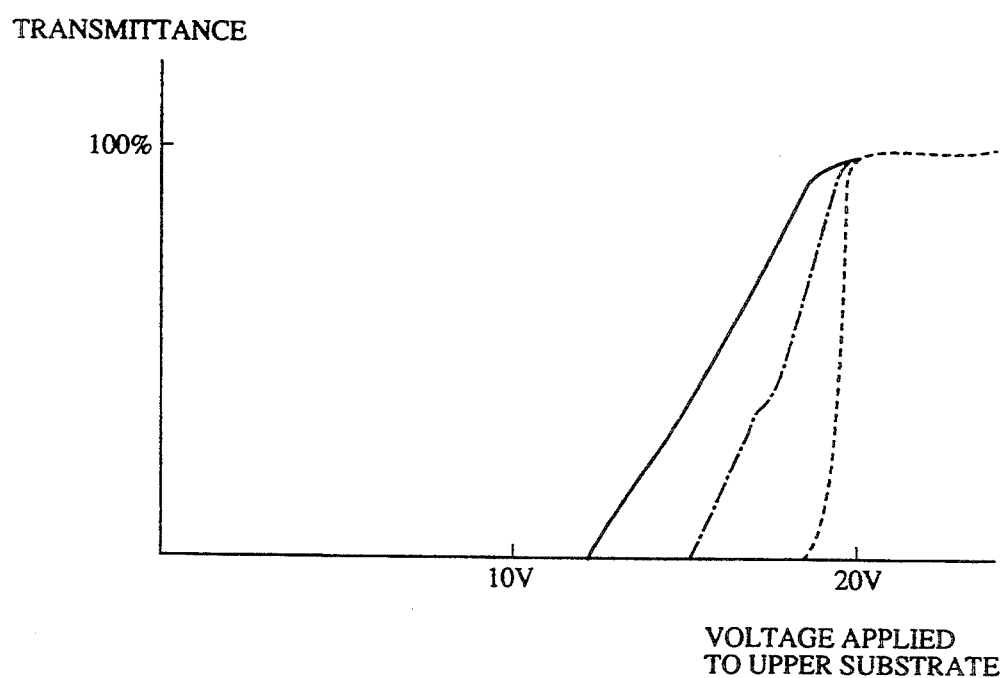
FIG. 9 is a graph illustrating a relation between the voltage applied to a liquid crystal device and transmittance.

FIG. 9 shows typical V-T (voltage-transmittance) characteristics. In FIG. 9, a dotted line and a one-dot chain line respectively represent as comparative examples a V-T curve of a flat cell without the stripe projections and potential gradient means, and a V-T curve in a case in which the stripe projections were provided on a usual ITO electrode, and no potential gradient was provided.

On the other hand, a solid line represents a V-T curve in an example of the present invention in which potentials of 2 V and 0 V (earth) were applied to the feeding electrodes 10 and 11, respectively, to provide a potential gradient.

Figure 4B:
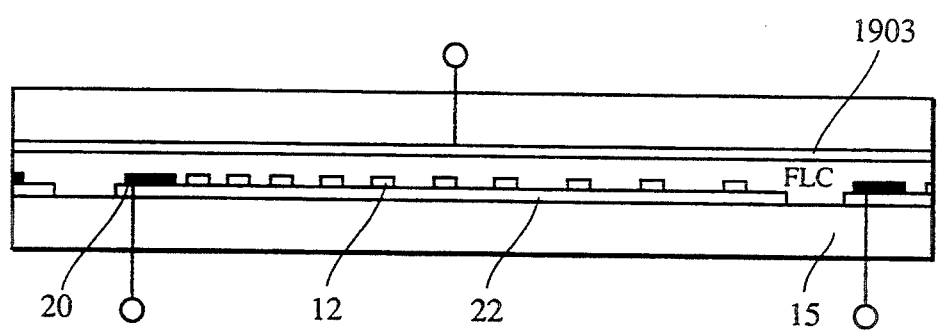

The device in accordance with another embodiment of the present invention shown in FIG. 4(b) is described below.

In the structure shown in FIG. 4(b), only a feeding electrode 20 is provided in place of the feeding electrodes 10 and 11 shown in FIG. 4(a). In the principle of formation of the electric field strength, the effect of delaying transmittance of the feed potential by employing a high-resistance film 22 is exerted as a distribution gradient of the electric field strength applied to the liquid crystal.

In this embodiment, the effect on gradation is possibly substantially the same as that obtained by the forced application of a potential gradient in the embodiment shown in FIG. 4(a), and the resultant gradation is also possibly similar to that shown in FIG. 9.

Figure 4C:
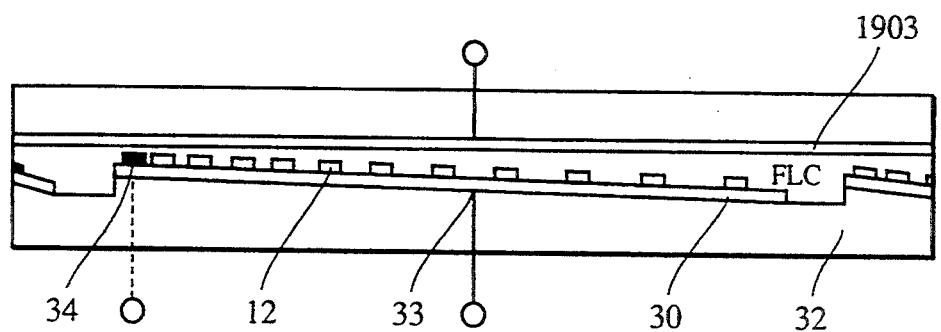

FIG. 4(c) shows a cell in accordance with a further embodiment of the present invention in which the lower substrate has a form which provides the cell thickness with a gradient in order to provide the electric field strength with a gradient distribution. In FIG. 4(c), reference numeral 30 denotes a general low-resistance electrode comprising ITO or the like.

In the above-described conventional example, when the projecting stripe portions With gradient space changes are not provided differently from the embodiment of the present invention, a difference between the greatest cell thickness and the smallest cell thickness as a gradient of the cell thickness should be a reciprocal of the electric field strength, i.e., about 30% of the greatest cell thickness. However, in this embodiment, since there is the threshold change caused by the projecting stripe portions, i.e., the gradation effect, the difference in the cell thickness caused by the overall gradient of the cell thickness can be decreased. As an example, when the projecting stripe portions at a height of 1500 Å are provided, satisfactory gradation can be obtained by providing a difference in the cell thickness of about 1500 Å. In this case, the spacer beads arranged in the cell have a diameter of about 1.4 μm. In this embodiment, the tapered substrate and the substrate on which the projecting stripe portions are provided may be different from each other. In this case, the pattern and cell are formed with attention to alignment of pixels.

In the device shown in FIG. 4(c), the projecting stripe portions 12 have the effects even if they are made of either a conductive material such as ITO or Cr, or an insulating material such as $SiO_2$. Even if the projecting stripe portions 12 are made of a conductive material, the feeding point 33 shown in FIG. 4(c) may be connected to any one of the projecting stripe portions 12 (for example, a feeding point 34 connected though a feeding line shown by a dotted line), or a plurality of the stripe portions so far as the projecting stripe portions 12 have substantially Continuity with a transparent electrode 30.

It is understood from the above description that the present invention exhibits good gradation characteristics. Particularly, in the present invention, a gradient is formed over one pixel, and the domain area can sufficiently be controlled in one gradation direction.

(Embodiment 1)

A resist pattern was formed on glass having a thickness of 1.1 mm, and an $SnO^2$ film was then formed on the glass by a reactive sputtering process in an atmosphere of oxygen and then lifting-off to form the high-resistance film 1905 shown in FIG. 1(d) having a thickness of about 500 Å. When, as the same lot, a gold electrode was formed in a comb tooth form on the same $SnO_2$ film on the same glass as those described above by evaporation, the measured sheet resistance was about $10^7$ Ω/□.

A resist was coated on the high-resistance film having a sheet resistance of $10^7$ Ω/□ formed as described above in the same way as that described above, followed by pattern exposure, development and washing. ITO was then deposited on the high-resistance film by ion plating and subjected to lifting-off to form the same lower substrate pattern as that shown in FIGS. 1(c) and 1(d). The height of the ITO pattern projections was about 1200 Å, the width of the projecting portions was 4 μm, and the space between the projecting portions was changed from 1 μm to 6 μm by 0.5 μm for every two line.

Polyimide LQ1802 was then spin-coated (spin conditions: concentration of 0.9 wt % relative to a solvent, 2200 rpm, 20 seconds) to form an orientation film which was then dried and burnt to form a film having a thickness of about 100 Å.

Similarly, polyimide LQ1802 was coated on the upper substrate shown in FIGS. 1(a) and 1(b) to form an orientation film. The upper and lower substrates Were rubbed and then combined through silica spacer beads of about 1.4 μm to form a cell. The rubbing direction was parallel with the lengthwise direction of the stripes on the substrate side where the projecting stripe portions were formed, and was shifted by about −10° from the stripe direction on the other substrate side. A ferroelectric liquid crystal having a Ps value of about 7 nC/cm$^2$ was injected into the cell.

Figure 10:
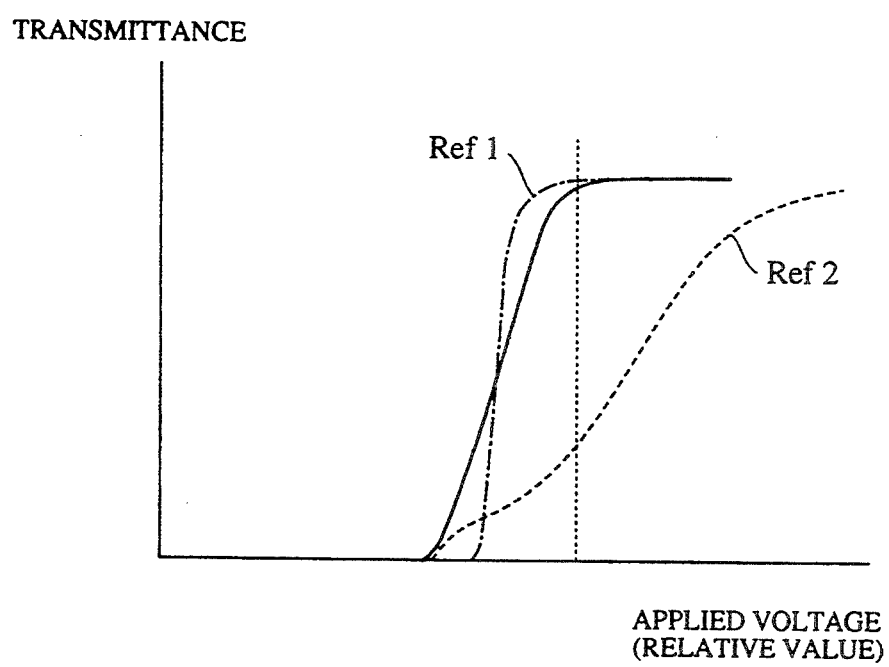
FIG. 10 is a graph illustrating a relation between the voltage applied to a liquid,crystal device and transmittance.

When the thus-obtained cell was driven by a driving waveform containing a writing pulse having a pulse width of 20 μsec, a good gradation characteristic as shown by a solid line of the V-T characteristic in FIG. 10 was obtained.

In FIG. 10, for comparison, a one-dot chain line represents the V-T characteristic of a flat cell in which general upper and lower electrode substrates as shown by the upper substrate in FIGS. 1(a) and 1(b) were combined in a cross matrix, and a dotted line represents the V-T curve in a case where the resistance film was not provided on the lower substrate shown in FIGS. 1(c) and 1(d).

(Embodiment 2)

An irregular pattern having stripes in which the stripe projecting portions had a width of 3 μm, and the space between stripes was increased from 1 μm to 7 μm in a step of 0.5 μm for every 2 stripe was formed by usual photolithography and etching using chromium (Cr). A solution of polyaniline known as a conductive polymer material was then coated by printing, immersed in 1N dilute sulfuric acid so so to make it conductive, and then dried. When the sheet resistance of the thus-formed film having a thickness of about 100 Å was measured as in Embodiment 1, a value of about $10^6$ Ω/□ was obtained.

On the other hand, the same polyaniline conductive film as that described above was formed on the other substrate (corresponding to the upper substrate shown in FIG. 1). The polyaniline films of both substrates were rubbed in the direction substantially parallel with the lengthwise direction of the stripe projections. A ferroelectric liquid crystal SBF6430 produced by Roche was injected, and an alternating current was applied (10 Hz, ±10 V, about 3 minutes) at a temperature of about 30° C. Gradation signal driving showed good gradation properties.

(Embodiment 3)

Coating type $SnO_2$ ultrafine particles doped with antimony and mixed with polysiloxane were coated between the $SiO_2$ high-resistance film on the lower substrate and the polyimide orientation film provided thereon, both of which were formed in Embodiment 1, and then dried to form a film having a thickness Of about 500 Å. In this embodiment, the thickness of the polyimide orientation film was about 50 Å.

A cell was formed by using the same upper substrate as that in the above embodiments. In this embodiment, good orientation and gradation were obtained. The irregular microstructure of the film in which the conductive ultrafine particles were dispersed seems to have good effects on orientation.

(Embodiment 4)

A resist pattern was formed on glass having a thickness of 1.1 mm, and a $SnO_2$ film was formed on the glass by the reactive sputtering process in an atmosphere of oxygen, followed by lifting-off to form the high-resistance film 14 shown in FIG. 4(a) having a thickness of about 200 Å. As the same lot, a gold electrode was deposited in a comb tooth form on the film formed on the same glass as that described above. Measurement of the sheet resistance of the obtained film showed a value of about $10^7$ Ω/□.

The feeding electrodes 10 and 11 shown in FIG. 4(a) were then formed in a width of about 10 μm by a usual Al etching process, followed by the same lifting-off process as that described above to form a stripe projection pattern 12. In this embodiment, the height of the feeding electrodes and the ITO pattern projections was about 1200 Å, the width of the projections was 4 μm, and the space between the projections was changed in a step of 0.5 μm from 2 μm to 10 μm with a gradient as in the above embodiments.

Polyimide LQ1802 was spin-coated (spin conditions: concentration of 0.9 wt % relative to a solvent, 2200 rpm, 20 seconds) to form an orientation film which was then dried and burnt to form a film having a thickness of about 100 Å.

On the other hand, an orientation film was formed on the upper substrate shown in FIGS. 3(a) and 3(b) by using the same polyimide LQ1802. The upper and lower substrates were rubbed and combined through silica spacer beads of about 1.4 μm to form a cell. The rubbing direction was substantially parallel with the lengthwise direction of the stripes on the side where the stripe projections were formed, and is shifted by about −10° from the stripe direction on the other substrate side. A ferroelectric liquid crystal having a Ps value of about 7 nC/cm$^2$ was injected into the Cell.

When a scanning voltage was applied to the feeding electrodes 10 and 11 of the cell so that the a difference of about 2 V was produced during gradation writing, and when gradation driving was performed by a driving waveform so that an information voltage containing a pulse wide of about 20 μsec as a writing width was applied to a counter electrode, the good gradation characteristic as shown by the solid line in FIGS. 7(a) and 7(b) was obtained.

(Embodiment 5)

The cell shown in FIG. 4(b) was formed by the same production method as in Embodiment 4. When a scanning voltage and a gradation information voltage were applied to the feeding electrode 20 and the counter electrode 1903, respectively, a good gradation characteristic was obtained.

(Embodiment 6)

The feeding electrode of the pattern of the projecting stripe portions of Embodiment 4 or 5 were formed directly on a glass substrate by the usual photolithography (etching) process using Cr (chromium). The width of the stripes was 3 μm.

A solution of polyaniline known as a conductive polymer material was then coated by printing, immersed in 1-N dilute sulfuric acid so as to make the polyaniline coating conductive, and then dried to obtain a film having a resistance of about $10^6$ Ω/□ and a thickness of about 100 Å.

On the other hand, the same polyaniline conductive film as that described above was also formed on the other substrate (upper substrate). The polyaniline films of the both substrates were rubbed in the direction substantially parallel with the lengthwise direction of the stripe projections.

A ferroelectric liquid crystal SBF6430 produced by Roche was then injected into the cell formed. After AC application in an environment at a temperature of about 30° C. (10 Hz, ±10 V, about 3 minutes), gradation driving was carried out in the same manner as in Embodiments 4 and 5 to obtain good gradation properties.

(Embodiment 7)

The lower substrate (gradient shape 32) shown in FIG. 4(c) was formed by the process of transferring a mold pattern made of an acrylic UV curable resin to a glass substrate. The ITO pattern 30 was then formed by usual photolithography, and the projecting stripe pattern 12 was further formed by lifting-off. In this embodiment, the difference in height of the tapered shape of the substrate was about 1500 Å, and the difference in height of the stripe projections was about 1500 Å. The orientation film and liquid crystal used were the same as those used in Embodiment 1.

In this embodiment, a good gradation characteristic was obtained as in the above-described embodiments.

Figure 11:
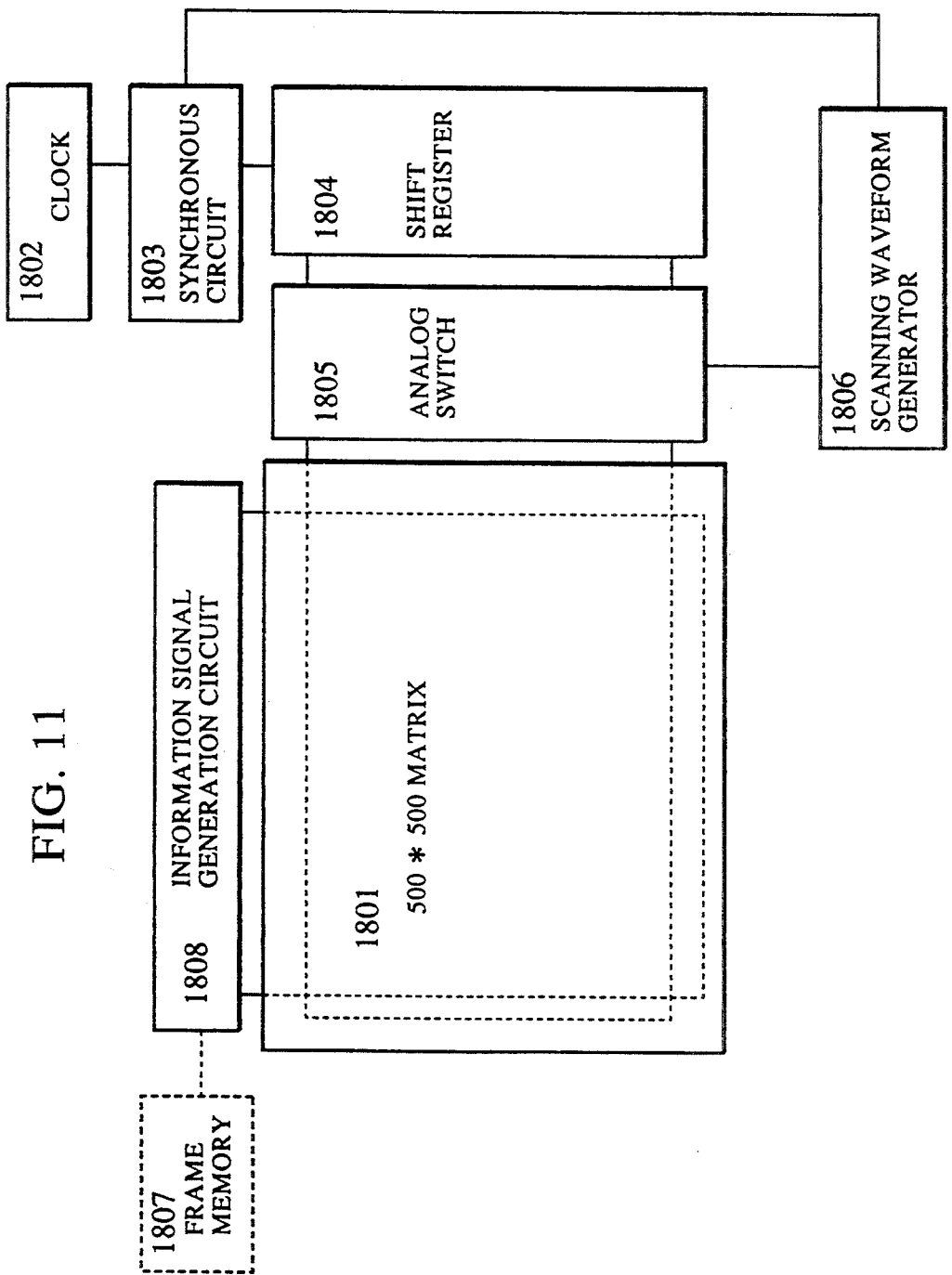
FIG. 11 is a block diagram illustrating a display apparatus comprising a liquid crystal device of the present invention.

FIG. 11 shows the construction of an image display apparatus having a liquid crystal display device in accordance with the present invention. The apparatus comprises a 500×500 matrix panel 1801 as a liquid crystal device, a clock 1802, asynchronous circuit 1803, a shift register 1804, a scanning waveform generator 1806 comprising an analog switch 1805 and so on, and an information signal generator 1808 for converting video information, for example, output from a frame memory 1807, into a driving signal and outputting the signal. These components may be disposed on both or either of the upper and lower sides of the matrix substrate or both or either of the right and left sides thereof and connected to the matrix substrate. A possible method of applying an information signal waveform as a half tone signal is voltage modulation which is generally known as a method of applying gradation information. However, in this embodiment, a driving method such as pulse width modulation, phase modulation method or the like is also effective, from the viewpoint of control of the propagation time, for making use of the domains connected in the manner of elastic propagation in the layer direction of chiral smectic C phase. Any one of the constructions shown in FIGS. 1(a)-(d), 3(a)-(c), 4(a)-(c) and 7(a)-(b) may be used as the construction of the panel pixels.

As described above, the present invention can maintain good reproducibility of half tone display, achieve half tone display having a desired applied signal-transmittance characteristic (y characteristic). The present invention also permit good half tone display at a high speed with a high degree of gradation and high definition, with hardly complicating the construction of the display device.

What is claimed is:

1. A liquid crystal device comprising a liquid crystal disposed between a pair of electrodes, wherein at least one of said electrodes has a plurality of stripe electrodes formed with continuity and different spaces therebetween within each of the pixels, and films provided at least in said spaces and having a sheet resistance of $10^4$ Ω/□ to $10^8$ Ω/□.

2. A liquid crystal device according to claim 1, wherein said spaces change with a gradient over one pixel.

3. A liquid crystal device according to claim 1, wherein each of said stripe electrodes comprises a projecting portion having a height of 5% to 15% of the thickness of the cell used.

4. A liquid crystal device comprising a liquid crystal held between a pair of electrodes, wherein at least one of said electrodes has a plurality of projecting portions formed within different spaces therebetween within each of the pixels, said spaces changing with a gradient within one pixel; and means for forming a distribution gradient of the strength of the electric field applied to said liquid crystal along the gradient of the space change.

5. A liquid crystal device according to claim 4, wherein said projecting stripe portions have a height of 5 to 15% of the cell thickness used.

6. A liquid crystal device comprising a liquid crystal held between a pair of electrodes, wherein at least one of said electrodes has first low-resistance stripe electrodes to which electricity is supplied, and a plurality of second stripe electrodes formed with different spaces therebetween within each of the pixels, and a film having a sheet resistance of $10^4$ Ω/□ to $10^8$ Ω/□ is provided between the first and second stripe electrodes.

7. A liquid crystal device according to claim 6, wherein said spaces change with a gradient over one pixel.

8. A liquid crystal device according to claim 6, wherein each of said stripe electrodes comprises a projecting portion at a height of 5 to 15% of the cell thickness used.

9. A liquid crystal device comprising a liquid crystal held between a pair of electrodes, wherein at least one of said electrodes has a plurality of projecting stripe portions formed thereon with different spaces therebetween within each of the pixels, the spaces between the respective projecting portions changing with a gradient within a pixel; and the electrode distance between said electrodes is provided with a gradient along the gradient of the space change.

* * * * *

UNITED STATES PATENT AND TRADEMARK OFFICE
CERTIFICATE OF CORRECTION

PATENT NO. : 5,446,570

DATED : August 29, 1995

INVENTOR(S) : SHUZO KANEKO, ET AL.

It is certified that error appears in the above-identified patent and that said Letters Patent is hereby corrected as shown below:

On the title page

IN THE DRAWINGS

Sheet 7 of 10, FIG. 8, "$\overline{B}$" should read --$\overline{D}$--.

COLUMN 2

Line 30, "pro,vide" should read --provide--.

COLUMN 3

Line 39, "where," should read --where--.
    Line 55, "Conventional" should read --conventional--.
    Line 63, "liquid,crystal" should read --liquid crystal--.

COLUMN 4

Line 20, "Changes" should read --changes--.
    Line 24, "2 space." should read --2 spaces.--.
    Line 49, "substrate 1904,i" should read --substrate 1904,--.

COLUMN 5

Line 31, "each" should read --each of--.
    Line 59, "a really" should read --areally--.

COLUMN 6

Line 45, "Optimum" should read --optimum--.
    Line 56, "quarts" should read --quartz--.

UNITED STATES PATENT AND TRADEMARK OFFICE
CERTIFICATE OF CORRECTION

PATENT NO. : 5,446,570

DATED : August 29, 1995

INVENTOR(S) : SHUZO KANEKO, ET AL.

It is certified that error appears in the above-identified patent and that said Letters Patent is hereby corrected as shown below:

COLUMN 7

Line 40, "batter" should read --better--.

COLUMN 8

Line 10, "SnO2," should read --$SnO_2$,--.
Line 54, "is a" should read --is areally--.
Line 55, "really" should be deleted.

COLUMN 9

Line 21, "FIG. 7." should read --FIGS. 7(a) and 7(b).--.

COLUMN 10

Line 22, "With" should read --with--.
Line 52, "Continuity" should read --continuity--.
Line 60, "$SnO^2$" should read --$SnO_2$--.

COLUMN 11

Line 11, "line." should read --lines.--.
Line 19, "Were" should read --were--.
Line 45, "2 stripe" should read --2 stripes--.
Line 49, "so so" should read --so as--.

COLUMN 12

Line 3, "Of" should read --of--.
Line 48, "Cell." should read --cell.--.
Line 54, "wide" should read --width--.

UNITED STATES PATENT AND TRADEMARK OFFICE
CERTIFICATE OF CORRECTION

PATENT NO. : 5,446,570
DATED : August 29, 1995
INVENTOR(S) : SHUZO KANEKO, ET AL.

It is certified that error appears in the above-identified patent and that said Letters Patent is hereby corrected as shown below:

COLUMN 13

Line 39, "asynchronous" should read --a synchronous--.

COLUMN 14

Line 4, "(y characteristic)." should read
--($\gamma$ characteristic).--.
Line 27, "within" (first occurrence) should read --with--.

Signed and Sealed this

Thirteenth Day of February, 1996

Attest:

BRUCE LEHMAN

Attesting Officer      Commissioner of Patents and Trademarks